July 22, 1930.  R. C. ALLEN  1,771,368
APPARATUS FOR MAKING TURBINE BLADES
Original Filed Dec. 3, 1924  2 Sheets-Sheet 1

INVENTOR
R.C. Allen
BY  a. B. Reavis
ATTORNEY

July 22, 1930.  R. C. ALLEN  1,771,368
APPARATUS FOR MAKING TURBINE BLADES
Original Filed Dec. 3, 1924   2 Sheets-Sheet 2

INVENTOR
R.C.Allen
BY
a.B.Rians
ATTORNEY

Patented July 22, 1930

1,771,368

UNITED STATES PATENT OFFICE

ROBERT C. ALLEN, OF SWARTHMORE, PENNSYLVANIA, ASSIGNOR TO WESTINGHOUSE ELECTRIC & MANUFACTURING COMPANY, A CORPORATION OF PENNSYLVANIA

APPARATUS FOR MAKING TURBINE BLADES

Original application filed December 3, 1924, Serial No. 753,582. Divided and this application filed June 14, 1927. Serial No. 198,852.

This application is a division of my application, Serial No. 753,582, filed December 3, 1924.

The present invention relates to a method and apparatus for making turbine blades, more particularly, low pressure blades, of the character disclosed in said application and also described herein, and it has for its object to provide a simplified method and apparatus of the character set forth.

Figure 2:
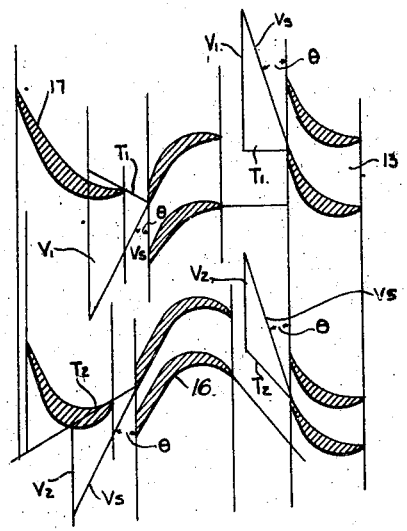
Figure 1:
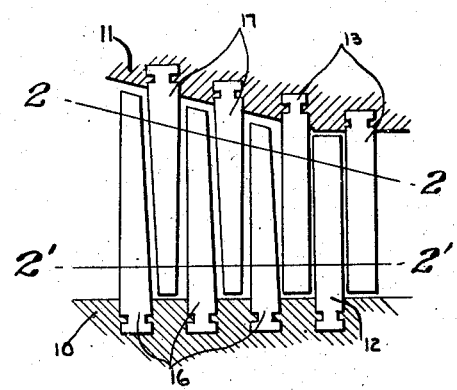
Figure 3:
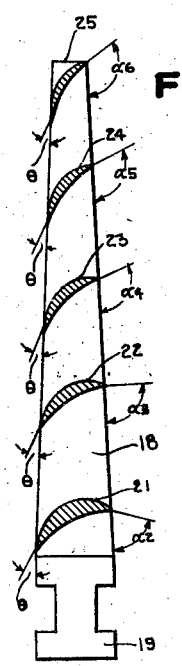
Figure 4:
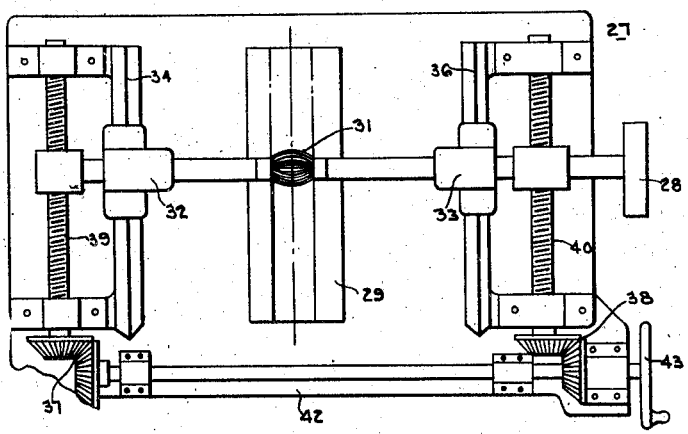
Figure 5:
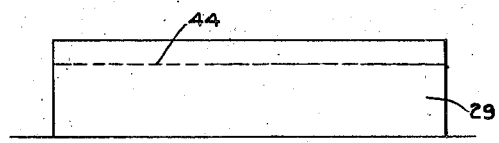
Figure 8:
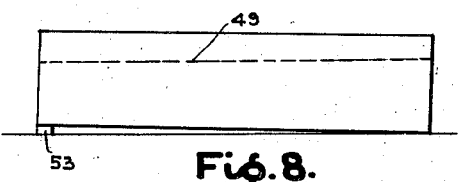
Figure 7:
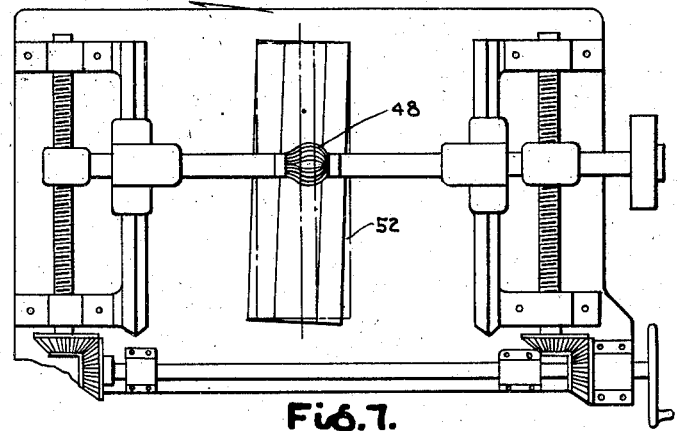
Figure 6:
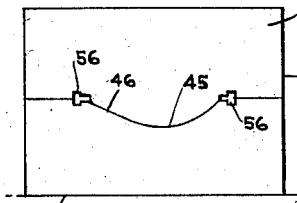
Figure 9:
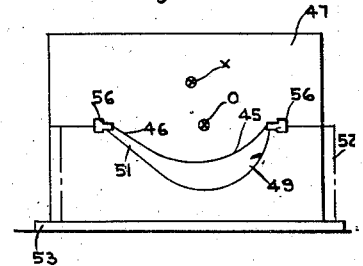
Figure 10:
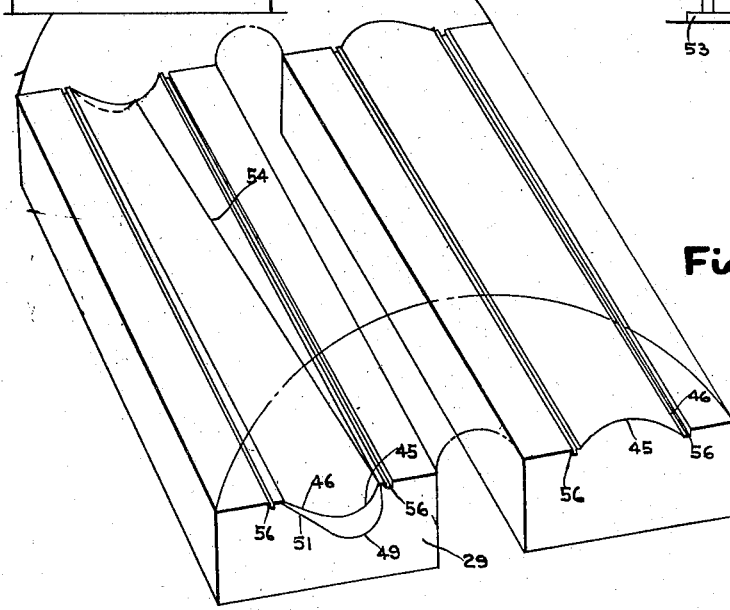

Apparatus embodying features of my invention is illustrated in the accompanying drawings forming a part of this specification in which:

Fig. 1 is a fragmentary sectional view of a turbine rotor and cylinder having my improved blading applied thereto; Fig. 2 is a diagrammatic view descriptive of the motive fluid flow through the blades and showing in section a part of the blades illustrated in Fig. 1 along the lines 2—2 and 2'—2' of Fig. 1; Fig. 3 is an elevation of one of the blades, drawn to a larger scale than Fig. 1 and showing in section the varying contour of the blade from root to tip; Fig. 4 is a plan view of a milling machine with a die block for forging my improved turbine blade in process of being formed; Fig. 5 is a side elevation of the die block shown in Fig. 4 and indicating the direction taken by the milling cutter shown in Fig. 4; Fig. 6 is an end elevation of the die block illustrated in Fig. 4, drawn to a larger scale and showing the contour of the cut made by the milling cutter in Fig. 4; Fig. 7 is a view of the milling machine and die block shown in Fig. 4, the position of the die block being altered from the position shown in Fig. 4; Fig. 8 is a side elevation of the die block showing from another view the position of the die block in Fig. 7 and also showing the direction of the cut made by the milling cutter illustrated in Fig. 7; Fig. 9 is a view similar to Fig. 6 showing the contour of the cut made by the milling cutter in Fig. 7, the altered position of the die block in Fig. 7 from that shown in Fig. 4, and the contour of the cameo member of the die block employed in forging the blades; and Fig. 10 is a perspective view of the completed die block and showing the surfaces of the blade developed thereby.

In turbines of the multi-stage type actuated by elastic fluid (hereinafter referred to as steam) the blade space between the rotor and the casing of the turbine increases from the end of the turbine where the high pressure steam is admitted to the exhaust end thereof in conformity, more or less, to the specific volume of the steam at the various pressures in the various stages of the turbine. Thus the blades in the high pressure end of the turbine are relatively short while the blades in the low pressure end are relatively long.

The diameter of the rotor of a turbine plus the length of a blade, which is equivalent to a diameter measured across the rotor between the midpoints of the blades on opposite sides thereof, is usually referred to in turbine practice as the "mean diameter of the blades." The low pressure blading in large condensing steam turbines has been made, in the past, as long as one-fifth of the mean diameter with a fair degree of efficiency. There is, of course, an appreciable difference in peripheral speed at the tip and at the base of a blade of this height, the tip having a peripheral speed 50% greater than the speed at the base in the case of a rotor blade. In past designs, where the length of the blade did not exceed one-fifth of the mean diameter, blades of parallel sections have been used for the reason that they may be more cheaply produced. Where the blades have been produced by drop-forging, the dies therefor have been machined by a planing or milling process. Where the blades have been cut from a solid bar, either milling or planing operations have been employed. With blades of parallel sections as great as one-fifth the mean diameter in length, there is some disturbance to the steam flow at the tip and at the base portions of the blade, inasmuch as the blade inlet angle is only correct at one point, usually at the mean diameter or mid portion of the blade.

In recent turbines it has been found necessary to use blades greater in length than one-fifth of the mean diameter and of higher peripheral speeds than those employed in the past. For such blades parallel sections can no longer be successfully employed as the centrifugal stresses in the rotor blades are entirely too high for the material usually employed in making the blades. It has therefore been found necessary to taper the blades from base to tip so that their cross sectional area increases from the tip toward the spindle at such rates that longer blades may be run at higher speeds but with no higher stresses than when blades of parallel sections are employed.

As the blades increase in length from the high to the low pressure end of the turbine, the speed of the tips of the moving blades relative to their root portions increases and the velocity of the motive fluid discharged from the moving blades, if considered relative to the stator or casing, is, in most practical applications, less at the tips than at the root portions of the moving blades. Assuming that the motive fluid leaves a row of moving blades at a constant angle to the side of the blade row from the root to the tip of the blades, the difference in speed of the blade at the root and the tip gives a resultant direction, or trajectory, to the steam leaving the blade row which varies progressively from the root to the tip, if the direction relative to the stator or casing be considered. Thus, the motive fluid may leave the root of the blade in a moving row, for example, with a trajectory at an acute angle relative to the stator, while at the tips of the blades the trajectory of the steam leaving the row may be at approximately a right angle, relative to the stator or even an obtuse angle, depending of course, upon the blade speed, the steam speed and the exit angle relative to the side of the blade row.

From the above it is evident that in order to avoid eddying of the motive fluid as it enters the succeeding row of stationary blades the inlet angles of those blades should be such as to correspond with the varying trajectory of steam leaving the preceding row of moving blades. In the example assumed in the preceding paragraph, the inlet angle of the succeeding stationary row of blades should be an acute angle at the base of the blade varying to approximately a right angle at the tip. Considering the relative motion of the stationary and moving blades it will be evident that the next succeeding row of moving blades should have similar corresponding inlet angles.

It is obvious that variation in outlet angles will cause a radial displacement of the center of gravity of the steam flow so that special problems will be introduced if the outlet angles are varied. Considering the foregoing, therefore, it will be apparent that the most efficient and desirable blade structure is one wherein the exit angles of the blades are constant and wherein the inlet angles vary from the roots to the tips of the blades in conformity to the varying trajectory of the entering steam.

In order to meet the requirements of a long tapered blade which may accommodate itself to the varying conditions of steam flow through the turbine, the manufacture thereof has heretofore been a long, laborious and very expensive process. It has been proposed to forge the blades and to thereafter warp or twist them by means of a suitable tool, in order to provide suitable inlet and leaving angles. Blades have also been made, rough forged, and the steam passages afterward formed by several separate machining and hand processes. Either of these methods is obviously expensive and attended with many difficulties.

In accordance with the invention set forth in the aforesaid copending application, I provide, by the present or other process, a relatively long, tapered blade, each surface of the port section of which is defined by cylindrical and plane surfaces, the axes of which diverge longitudinally and laterally of the blade from the tip to the root thereof, and which provides a constant leaving angle and a varying inlet angle from tip to root of the blade in accordance with varying conditions of steam flow in the turbine.

In accordance with the present invention, I produce this blade by drop-forging, employing in the process an improved die block which is simple of design and easy of manufacture, whereby blades of the greatest efficiency may be produced at a minimum of cost, and which require no twisting or warping to accommodate varying conditions of steam flow.

Referring now to the drawings for a better understanding of my invention, I show in Fig. 1, at 10, a fragment of a turbine rotor and at 11 a fragment of a cylinder. At 12 is shown a row of moving blades carried by the rotor 10 and at 13—13 rows of stationary blades carried by the cylinder 11. The rows of blades 12 and 13 are of parallel section as they are of lesser height than rows 16 and 17 following and therefore may not require the tapering or working for the reasons stated above. They are followed by moving rows of tapered blades 16—16 and stationary rows of tapered blades 17—17, said blades being made in accordance with my invention. The direction of flow of steam through the blades is from right to left and may be better understood by reference to Fig. 2, wherein a typical steam flow condition through rows 13, 16 and 17 is shown.

In Fig. 2 the blade sections in the upper part of the figure represent the stationary rows of blades 13 and 17 and the moving row 16 along the line 2—2 of Fig. 1, while the lower blade sections represent the same rows along the line 2'—2' of Fig. 1. Accompanying the rows 13 and 16 are velocity diagrams in which Vs represents steam velocity, which is constant from the root to the tips of the blades; V¹ represents blade velocity along the line 2—2 of Fig. 1; V² represents blade velocity along the line 2'—2' of Fig. 1; T¹ and T² represent the trajectory of the steam leaving a blade row relative to the succeeding row of blades along the lines 2—2 and 2'—2', respectively, of Fig. 1. The angle θ represents the leaving angle of the steam from each row of blades, which angle is constant throughout the blade length for both the stationary and moving blades. The varying trajectory T¹ and T² is determined by, and is a component of, the leaving angle of the steam relative to the blade row, the velocity of the steam and the velocity of the moving blade row at the point considered. The angles made by T¹ and T² with the side of the blade row determine the inlet angle of the next succeeding row of blades at that point. Inasmuch as the blade velocity along the line 2—2 is much greater than the blade velocity along the line 2'—2' the inlet angle along the line 2—2 as determined by the trajectory T¹ is much greater than the inlet angle along the line 2'—2' as determined by T² in order to avoid disturbances in the steam flow as hereinbefore pointed out.

Referring to Fig. 3, I show in further detail a blade made in accordance with my invention. In this figure 18 represents the port, or working section, of the blade and 19 the root or holding section which may be of any form known in the art. Sectional views of the port section 18 are shown in 21, 22, 23, 24 and 25, said sectional views showing the inlet and leaving angles of the blade at the respective points selected. It will be noted that the port section 18 of the blade increases in cross section from the root to the tip thereof and that the leaving angle θ is constant from the root to the tip. The inlet edge of the blade makes an angle with the side of the blade row as shown at α2, α3, α4, α5 and α6 said angles being relatively small near the root of the blade and increasing toward the tip in order to accommodate the varying trajectory of the steam from the next preceding row of blades as shown in Fig. 2 and prevent disturbances in the steam flow. In accordance with my invention the blade is so produced that the inlet angles increase progressively from the root to the tips of the blades as may best be understood by reference to the method of making the blade which will now be described.

In Fig. 4, I show a milling machine 27 which may be driven by any suitable means as by a belt pulley 28. Mounted upon the machine bed is a block 29 to be machined for forming the intaglio member of the die block which I employ in forging the turbine blades. A milling cutter 31 is carried by journal bearings 32 and 33, the latter being fitted to guides 34 and 36 so that they may be moved back and forth in the cutting operation. Feed mechanism for the milling cutter 31 is associated with the bearings 32 and 33, such for example, as sets of beveled gears at 37 and 38, feed screws 39 and 40, a drive shaft 42 and a hand-operating wheel 43.

In the operation illustrated in Fig. 4 the block 29 is placed at right angles to the cutter 31 and the cut is made straight through the face of the block as indicated by the dotted line 44 in Fig. 5. The contour of the cut which I have found desirable for reaction blades is illustrated in Fig. 6 and comprises a cylindrical surface 45 supplemented by a flat tangential surface 46. The surfaces 45 and 46 define the contour of the cameo member of the die block which is illustrated at 47 and consequently the contour of the concave or working face of the blade. The flat surface 46 is at the leaving side of the blade, while the curved surface 45 is at the inlet side. Each of these edges may be progressively changed from root to tip of the blade in the operation about to be described and which constitutes one of the most important features of my invention.

Referring to Figs. 7, 8 and 9, I show the next operation in making the die block. In the operation here illustrated, I show a milling cutter 48 which makes a cut in the block 29 having a contour as illustrated in Fig. 9, comprising a curved surface 49 supplemented by a flat, tangential surface 51. It is to be understood, however, that the particular contour of either of the cuts illustrated will vary with the area and configuration of the required steam passages between adjacent blades. The curved surface 49 and the flat surface 51 define the back of the blade. In making the cut here illustrated the block 29 is shifted at one end to one side from the position illustrated in Fig. 4, and as illustrated by the dotted line 52 in Figs. 7 and 9 and also raised at one end as shown at 53, Figs. 8 and 9. The cutter 48 is now driven straight through the block 29, which has been shifted to the position indicated, and in traversing said block the right side of the surface 49, as shown in the drawing, approaches and cuts the right edge of the surface 45. In proceeding through the block 29 a different part of the curved surface of the milling cutter 48 cuts across the curved surface 45 describing therewith a skew curve, or a curve of double curvature.

As is well understood in the art, when producing an article by forging, it is necessary that a space be left along the inner edges of the striking surfaces of the die members for the flow of metal. This is necessary in order to produce an article of definite dimensions. I accordingly show spaces 56—56 at each side of the die block to accommodate the beforementioned flow of metal. These spaces or grooves may be formed by any suitable process. When the metal for forming the blade is forged, therefore, there will be at each side thereof a fringe of rough metal extending the length of the blade. In the final completion of the blade this fringe is cut off by any suitable process, preferably in a straight line along the edges of the blade. The resultant inlet edge of the blade then is finally resolved into a plane curve, the curvature of which depends upon the curvature of the cylindrical surface 45 and the direction of the cut diagonally across said surface.

The inlet edge of the blade being defined by a plane curve extending from end to end of the port section 18 of the blade, results in a flattening out of the inlet angle or causing it to become progressively greater from the base to the tip as will be more particularly described later. In making the cut last described the block 29 is raised at its lower end as indicated at 53 in Figs. 8 and 9. The milling cutter 48 is driven straight through the face of the block 29 so that the curved surface 49 is cut deeper at the lower end of the block than at the upper end and gradually approaches the curved surface 45 of the cameo member 47 as it approaches the top, the two surfaces 45 and 49 thus defining an area of progressively decreasing cross section from base to top. Referring to Fig. 9 the axis of the surface 49 is indicated at O and the axis of the surface 45 at X, said axes lying in different horizontal planes. Upon considering the paths of the milling cutters 31 and 48 in describing these two surfaces as illustrated in Figs. 4 and 7, it will be seen that the axes O and X converge longitudinally and laterally from the base to the top of the area defined.

In the particular blade heretofore described, which blade represents the preferred embodiment of my invention, the axes O and X do not, at any time, intersect, the axis O passing beneath and beyond the axis X. It is entirely possible, however, that a blade might be developed in the manner described in which the relative inclination of the two curved surfaces 45 and 49 be such as to result in intersecting axes.

In Fig. 10, I show a perspective view of the completed die block wherein the contour of the port section 18 of the blade with its surfaces 45 and 46 are shown lying in the intaglio member 29. The direction of the inlet edge of the blade with respect to the cylindrical surface 45 is indicated at 54. It will be plain that the line 54 cutting the curved surface 45 defines an inlet edge for the port section 18 of the blade, said inlet edge being such as to present a progressively increasing angle to the side of the blade row from base to tip. It will be further evident that the two flat surfaces 46 and 51 cooperate to provide a leaving edge which presents a constant angle to the side of the blade row.

In the foregoing description, the manner of developing the cameo member 47 of the die block has not been described. Inasmuch as the cross sectional area of the cameo member is constant throughout it may be produced by any suitable machining process known in the art and which will not be necessary to describe here. The intaglio member may also be produced by other machining processes than milling. For example, the operations described may also be carried out by a planing process and it is to be understood that the particular machining process therein described is for the purpose of illustration and is that which appears to me to be the best suited for the operation. It is further to be understood that the cooperating surfaces defining the blade may be developed in the reverse to that described; that is, the area defined by the surface of the intaglio member might be of a constant cross section and the area defined by the cameo member might be variable without departing from the spirit of my invention.

While I have shown my invention in but one form, it will be obvious to those skilled in the art that it is not so limited, but is susceptible of various other changes and modifications, without departing from the spirit thereof, and I desire, therefore, that only such limitations shall be placed thereupon as are imposed by the prior art or as are specifically set forth in the appended claims.

What I claim is:—

1. A die block for forging a turbine blade embodying cooperating members having cylindrical surfaces with axes diverging laterally and longitudinally from the tip of the block to the base.

2. A die block for forging a turbine blade embodying cooperating members having convex and concave curved surfaces, respectively, each of said surfaces being supplemented by a flat tangential surface, the axes of said curved surfaces converging longitudinally and laterally from the base toward the tip.

3. A die block for forging a turbine blade comprising a cameo member having a convex cylindrical surface of uniform cross sectional area supplemented at one side by a flat surface, and an intaglio member having a concave cylindrical surface supplemented by a flat surface complementary to the flat surface of the cameo member, the axes of said cylindrical surfaces converging longitudinally and laterally from one end of the block to the other.

4. A die block for forging a turbine blade having a constant leaving angle and an inlet angle increasing progressively from the base to the tip thereof, comprising a cameo member with a convex cylindrical surface of uniform cross sectional area supplemented at one side by a flat surface, and an intaglio member having a concave cylindrical surface supplemented by a flat surface complementary to the flat surface of the cameo member, the axes of said cylindrical surfaces converging longitudinally and laterally from the root to the tip of the blade.

5. A die block for forging a turbine blade having a port section wider near the root portion than the tip, with a constant leaving angle and an inlet angle increasing progressively from the base to the tip, comprising cooperating members with cylindrical surfaces, said cylindrical surfaces having axes diverging longitudinally and laterally from one end of the block to the other.

6. A die block for forging a turbine blade embodying cooperating members having curved surfaces, the axes of said surfaces diverging laterally and longitudinally, with respect to the cross-section of the block, from one end of the block to the other end.

7. A die block for forging a turbine blade comprising a cameo member having a convex curved surface and an intaglio member having a concave curved surface, an axis of the concave curved surface being inclined relative to an axis of the convex curved surface both longitudinally and laterally, with respect to the cross-section of the block, from one end thereof toward the other.

8. A die block for forging a turbine blade comprising a cameo member having a convex curved surface and a cooperating intaglio member having a concave curved surface, the axes of said surfaces diverging longitudinally, with respect to the cross section of the block, from one end of the block to the other end.

In testimony whereof, I have hereunto subscribed my name this 8th day of June, 1927.

ROBERT C. ALLEN.